March 1, 1949.  F. R. ENSINGER ET AL  2,463,092

BRAKE ADJUSTER

Filed Sept. 25, 1947

Inventors
Floyd R. Ensinger
Edward W. Stults

By Clarence A. O'Brien
and Harvey B. Jacobson
Attorneys

Patented Mar. 1, 1949

2,463,092

UNITED STATES PATENT OFFICE 2,463,092

BRAKE ADJUSTER

Floyd R. Ensinger, Cincinnati, Ohio, and Edward W. Stults, North Vernon, Ind.

Application September 25, 1947, Serial No. 776,063

2 Claims. (Cl. 188—79.5)

This invention appertains to novel and useful improvements and structural refinements in brake adjusting means particularly adaptable for use in conventional automotive vehicles.

An object of this invention is to adjust brakes normally associated with vehicles automatically.

Another object of this invention is to provide means for carrying out the above mentioned function.

Another purpose of this invention is to provide means for exerting frictional force between a link and a conventional brake shoe of a greater magnitude than the tensile force exerted by the conventional spring in brake systems.

Another object of this invention is to provide means for automatically taking up the clearance in brake shoes due to normal wear thereof.

Another object of this invention is to provide an extremely simple means of automatically adjusting brakes which is practical, inexpensive and easily applicable to automotive vehicles now in use.

Ancillary objects and features of novelty will become apparent to those skilled in the art, in following the description of the preferred form of the present invention, illustrated in the accompanying drawings, wherein.

Referring now in detail to the illustrated preferred embodiment of the present invention, like reference characters are used throughout to indicate similar elements thereof.

This invention has been developed to provide a device for more efficaciously adjusting the usual brakes on conventional automotive vehicles. A brief description of the general operation of the invention will render understanding of the same immediately obvious. Accordingly, the operation will be set forth in detail at this time.

Figure 1:
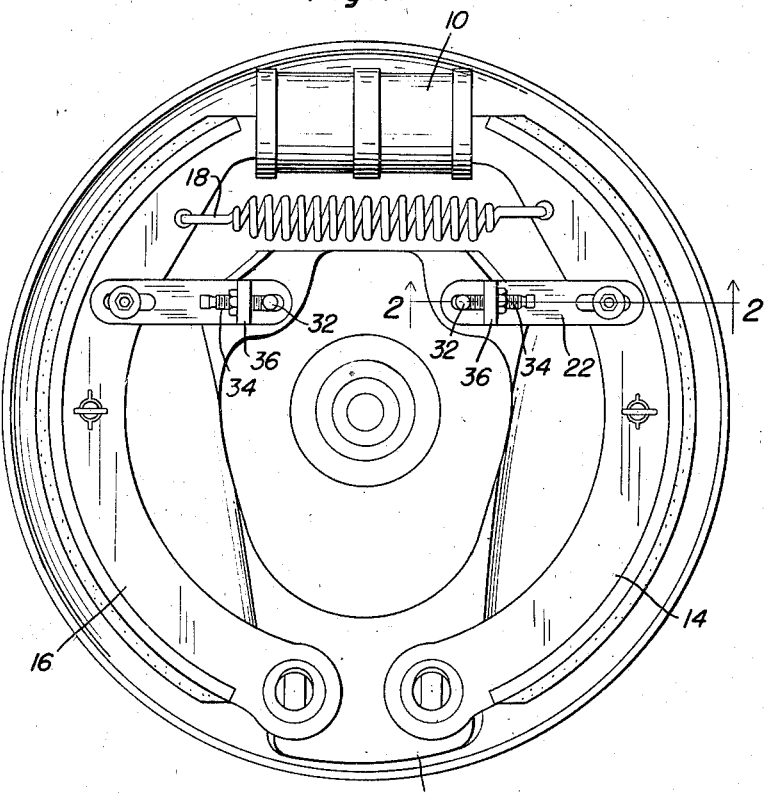
Figure 1 is a plan view illustrating an embodiment of the present invention.

Hydraulic (or other type) pressure applied to the wheel cylinder 10 forces the brake shoes outwardly against the brake drum, slipping the tension bolt assembly outward on the tensile adjustment link in a slot. Friction between certain operative elements of the slipping tension bolt assembly is provided of such value to withstand approximately twenty-five pounds or more pull than is produced by the brake shoe return spring. This, of course, holds the brake shoe from returning more than a predetermined amount of clearance set with adjustment screws, immediately obvious from Figure 1, at a point on a stud bolt. As the brake linings wear, the brake shoes are forced outward farther on the adjustment link, holding the same clearance at all times.

The structure for performing the above mentioned operation is as follows: A hydraulic cylinder 10 is associated with a conventional back plate 12 and conventional brake shoe assemblies 14 and 16 are associated with the above mentioned elements. The usual conventional tension spring 18 is secured between the brake shoes 14 and 16, serving the normal, usual function.

Figure 4:
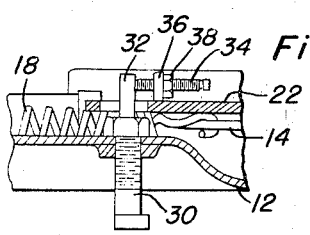
Figure 4 is a slightly modified form of the invention shown in Figure 1, illustrating particularly a different type of stud which may be utilized therewith.
Figure 2:
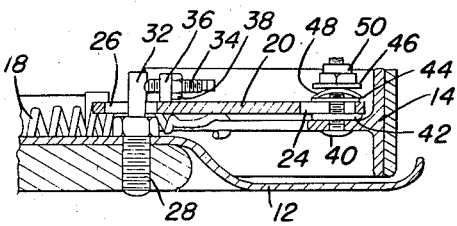
Figure 2 is a sectional view of the invention shown in Figure 1 and taken substantially on the line 2—2 thereof and in the direction of the arrows.
Figure 3:
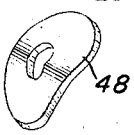
Figure 3 is a perspective view of a spring biasing means utilized in conjunction with and forming part of the invention.
Figure 5:
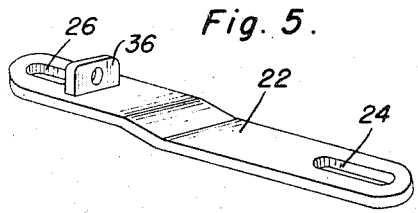
Figure 5 is a perspective view of the tension link forming an important part of the present invention.

Going now to Figure 2, the nucleus of the invention is set forth. A tensile link 20 is provided. In certain types of construction, it may be desirable to utilize a tensile link having an offset portion therein, as shown at 22 in Figure 5. This, however, is but a matter of choice of design. Slots 24 and 26 respectively are provided in the tensile link 20 and the said slot 26 has a stud 28 extending therethrough. If so desired, a second type of stud 30 (see Fig. 4) may be utilized in conjunction with the said slot 26. Further, the reduced portion or pin 32 extending from the said studs 28 or 30 are engageable by a threaded adjustment member 34. This adjustment member may be noted as received in a bracket or perch 36 which is, in turn, secured to the tensile link 20. A lock nut 38 may be associated with the perch 36 and screw 34 for the obvious purpose of serving as locking means.

Associated with the other slot 24 is a screw or the like 40 extending through the brake shoe 14 and the said slot 24. A washer 42 may be interposed between the tensile link 20 and the shoe 14 while a second washer 44 is positioned on the upper portion of the said tensile link 20. A third washer 46 is received on the screw 40 and spaced from the said washer 44 by a suitable resilient biasing means 48. The preferable resilient biasing means is a bent clip 48. Of course, a suitable nut 50 is then placed on the said washer 46 for securing purposes. It is this last-mentioned assembly which exerts the frictional force between the brake shoe 14 and the tension link 20 which overcomes the normal force of the spring 18.

While there has been described and illustrated but a single preferred embodiment of the present invention, capable of performing all of the specifically mentioned objects as well as numerous ancillary objects, it is apparent to those skilled in the art that various changes and departures may be made therefrom without departing from the spirit of the invention. Accordingly, limitation is sought only in accordance with the scope of the following claims.

Having described the invention, what is claimed as new is:

1. In a brake system, a brake plate and brake shoes, means for automatically adjusting each of the brake shoes comprising for each of said brake shoes a stud rigidly engageable with the brake plate, a link floatingly secured to said stud, means associated with said link and stud for limiting the travel of said link, an anchor bolt adapted to be secured to said brake shoe, a slot in said link having said anchor bolt loosely received therein, means for exerting a selected amount of resistance to movement between said anchor bolt and said link, said limiting means comprising a perch on said link having a rod adjustably associated therewith engaging said stud.

2. In a vehicle brake system, a brake plate and brake shoes, means for automatically adjusting each of the brake shoes comprising for each of said brake shoes a stud rigidly engageable with the brake plate, a link floatingly secured to said stud, means associated with said link and stud for limiting the travel of said link, an anchor bolt adapted to be secured to said brake shoe, a slot in said link having said anchor bolt loosely received therein, means for exerting a selected amount of resistance to movement between said anchor bolt and said link, said last-mentioned means including a pair of washers on said bolt, resilient biasing means between said washers, said limiting means including a perch on said link having a rod adjustably associated therewith engaging said stud.

FLOYD R. ENSINGER.
EDWARD W. STULTS.

REFERENCES CITED

The following references are of record in the file of this patent:

UNITED STATES PATENTS

| Number | Name | Date |
|---|---|---|
| 1,939,584 | White | Dec. 12, 1933 |
| 2,286,711 | Buffington | June 16, 1942 |